United States Patent [19]
Mihara et al.

[11] Patent Number: 4,795,925
[45] Date of Patent: Jan. 3, 1989

[54] ENCODER MOTOR HAVING CODE WHEEL INTEGRAL WITH ROTOR

[75] Inventors: Takahisa Mihara, Sagamihara; Shoji Sanma, Yokohama, both of Japan

[73] Assignee: Fujitsu Limited, Kanagawa, Japan

[21] Appl. No.: 16,606

[22] Filed: Feb. 19, 1987

[30] Foreign Application Priority Data

Feb. 20, 1986 [JP] Japan .................... 61-33753
Feb. 20, 1986 [JP] Japan .................... 61-33749
Feb. 20, 1986 [JP] Japan .................... 61-22048[U]
Jul. 18, 1986 [JP] Japan .................... 61-109460[U]

[51] Int. Cl.⁴ .................... H02K 11/00; G11B 21/08
[52] U.S. Cl. .................... 310/68 B; 310/116; 310/266; 335/222
[58] Field of Search ............ 310/67 R, 68 B, 266, 310/68 R, 116; 324/150, 151, 208; 335/222, 224; 360/106, 78

[56] References Cited
U.S. PATENT DOCUMENTS

| | | | |
|---|---|---|---|
| 3,076,111 | 1/1963 | Burgwin | 335/222 |
| 4,329,604 | 5/1982 | Dunstan et al. | 310/68 R |
| 4,398,167 | 8/1983 | Dickie et al. | 310/266 |
| 4,521,706 | 6/1985 | Kudelski et al. | 310/266 |
| 4,609,954 | 9/1986 | Bolton et al. | 360/106 |

*Primary Examiner*—Peter S. Wong
*Assistant Examiner*—D. S. Rebsch
*Attorney, Agent, or Firm*—Armstrong, Nikaido, Marmelstein & Kubovcik

[57] ABSTRACT

An encoder motor comprising: an encoder incorporated in the encoder motor, for carrying out positional detection and having an encoder code wheel fitted to a motor rotary shaft of the encoder motor; a coil formed as a moving coil movable together with the motor rotary shaft; a magnet operative with respect to the moving coil; and a bobbin in the form of cylinder on which the moving coil is disposed. The bobbin is arranged concentrically with respect to the motor rotary shaft and directly fixed to the code wheel of the encoder.

20 Claims, 10 Drawing Sheets

Fig. I(A)
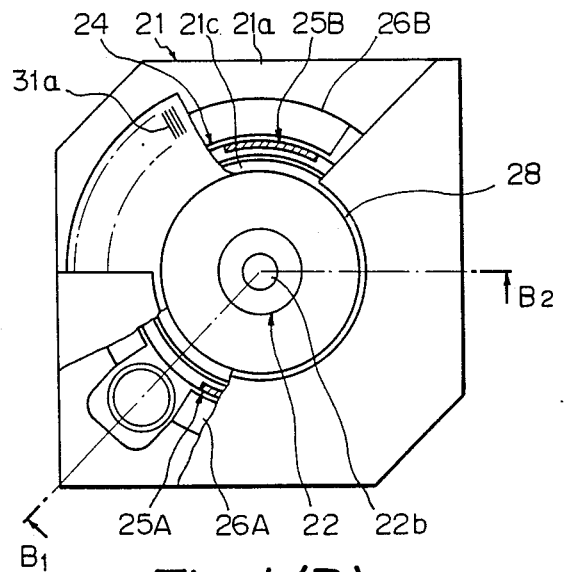
Fig. I(B)
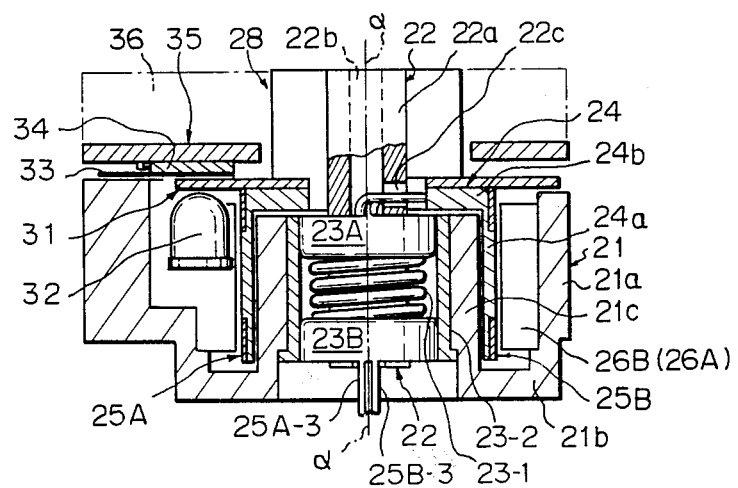

ENCODER MOTOR HAVING CODE WHEEL INTEGRAL WITH ROTOR

BACKGROUND OF THE INVENTION

1. Field of the Invention

The present invention relates to a moving coil type encoder motor adapted for example, for speed control (course control) and position control (fine control) in accordance with position signals transmitted from the encoder incorporated with a head positioning actuator of a magnetic disk drive, and particularly, to the constitution of a motor portion of the encoder motor. The "encoder motor" is an apparatus in which an encoder and a motor are integrally formed.

2. Description of the Related Art

Several attempts have been made to use an encoder motor for, for example, a magnetic head positioning system (an actuator positioning system) of a compact magnetic disk drive. Such an encoder motor must be very compact, be capable of a quick acceleration (high-speed access), and have a high rigidity. However, an encoder motor of this type, particularly a moving coil type, which can satisfy the above requirements, has not been developed. Conventional encoder motors are mostly the moving magnet type, which does not substantially satisfy the above requirements, since the moving magnet type encoder motor has the following drawbacks:

(1) A part of a rotary member of the encoder motor is constituted by a yoke and magnets having large mass, so that the total inertia of the rotary member is very large and thus hinders any attempt to improve the speed of the encoder motor.

(2) The eddy current loss and hysteresis loss occurring in a core (a stator) of the encoder motor generate a rotational resistance that also hinders any improvement in the speed thereof.

(3) To improve the speed, the number of coil windings must be increased to increase the torque (electromagnetic force) to be generated, and thus the size of the coil is unavoidably enlarged to make a compact encoder motor not feasible.

(4) Since the rotating mass of the rotary member is large, and since the torque is transferred via the magnets and yoke and a shaft to a code wheel in the encoder motor, the rigidity of the rotary member is low, and the resonance point (natural frequency) thereof is also low. Accordingly, the rotary member is resonated with a low frequency (a low number of oscillations) to cause torsional vibration in the shaft, thereby reducing the speed and controllability of the encoder motor. Namely, with respect to the magnets, i.e., a driving source of the rotational movement, rotational deviations and vibration tend to occur in the code wheel, i.e., an output source of the control signals, and in a capstan, i.e., a final output portion for a controlled member (driven member such as a positioning member). Further, bearings for supporting the shaft are held by a cover and a case, which are not integrally formed, so that it is difficult to realize a mechanical accuracy of the portions holding the bearings. Accordingly, the deflection accuracy of the shaft and the squareness of a plane of the code wheel with respect to an axis of rotation of the shaft is not maintained, and therefore, a precise control is not feasible.

SUMMARY OF THE INVENTION

In view of the above, it is an object of the present invention to provide a moving coil type encoder motor which is compact and has a high speed and a high rigidity (high resonant frequency).

To accomplish this object, the present invention provides an encoder motor comprising an encoder for detecting position having an encoder code wheel attached to a motor shaft in the vicinity of a moving coil or moving magnet for generating rotational force.

To accomplish the object, the present invention also provides an encoder motor incorporating a position detecting encoder having an encoder code wheel fitted to a rotary shaft of the encoder motor, and having a plurality of coils and a plurality of magnets. The coils form a moving coil movable around the rotary shaft of the encoder motor. The moving coil is arranged on a bobbin having a cylindrical shape. The bobbin is arranged concentrically with respect to the rotary shaft of the encoder motor and fixed directly to the code wheel which constitutes the encoder.

To accomplish the object, the present invention also provides an encoder motor comprising an encoder code wheel attached to a motor shaft, the wheel being substantially integral with a moving coil or moving magnet for generating rotational force.

Since the bobbin has a cylindrical shape and is fixed directly to the encoder code wheel, and since the moving coil formed by flat coils is arranged on the periphery of the bobbin, the total inertia of a rotary portion of the encoder motor can be minimized. As a result, a quick acceleration, compact size, and high rigidity (high resonant frequency) are realized in the encoder motor. Further, bearings for supporting the rotary shaft of the encoder motor are held by one cylindrical surface of a bearing holding wall formed integrally with a motor case, so that a mechanical accuracy in fitting the bearings can be improved to improve a rotational accuracy of the encoder motor.

BRIEF DESCRIPTION OF THE DRAWINGS

These and other objects and features of the present invention will become apparent from the following description with reference to the accompanying drawings, in which:

FIGS. 1(A) and 1(B) are a top view and a cross-sectional view, respectively, showing an encoder motor according to an embodiment of the present invention, in which FIG. 1(B) is a view taken along a line $B_1$–$B_2$ shown in FIG. 1(A);

FIGS. 4(A) and 4(B) are a top view and a cross-sectional view respectively, showing an encoder motor according to another embodiment of the present invention, in which FIG. 4(B) is a view taken along a line $A_1$–$A_2$ shown in FIG. 4(A);

FIGS. 6(A), 6(B), and 6(C) are a top view, a side view, and a bottom view, respectively, showing a terminal fixing plate of the embodiment shown in FIG. 4, in which FIG. 6(B) is a view in the direction of an arrow "C" shown in FIG. 6(A), and FIG. 6(C) is a view in the direction of an arrow "D" shown in FIG. 6(B);

FIGS. 7(A) and 7(B) are a side view and a plan view, respectively, showing an intermediate lead wire of the embodiment shown in FiG. 4, in which FIG. 7(B) is a view in the direction of an arrow "E" shown in FIG. 7(A);

FIGS. 9(A) and 9(B) are a plan view and a side view, respectively, showing, a collar of the embodiment shown in FIG. 4, in which FIG. 9(B) is a view in the direction of an arrow"G" shown in FIG. 9(A);

DESCRIPTION OF THE PREFERRED EMBODIMENTS

Before describing the preferred embodiments of the present invention, an explanation will be given, with reference to FIG. 12, of a moving coil type encoder motor used by the present inventor before the present invention and not known to public.

Figure 12:
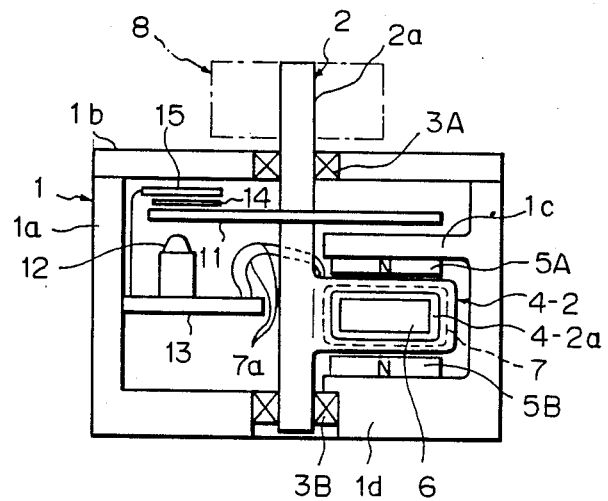
FIG. 12 is an explanatory view showing an encoder motor used by the present inventor before the present invention and not known to the public.

As shown in FIG. 12, the encoder motor is formed as an oscillating motor. Namely, the rotation angle of a rotary shaft of the encoder motor is limited within the range of, for instance, about 100°.

A motor case 1 comprises a case body 1a having a cylindrical shape with a bottom, and a cover 1b fitted to an opening of the case body 1a.

A shaft (rotary shaft) 2 has an end portion 2a projecting outward from the cover 1b and is supported at the center of the motor case 1 through bearings 3A and 3B in such a manner that the shaft 2 is rotatable freely in normal and reverse directions.

Fixed to the shaft 2 inside the case 1 is a cantilever-like bobbin 4-2 which is concentric with respect to the shaft 2 and has a hollow portion 4-2a passing through the bobbin 4-2 in a circumferential direction.

On the periphery of the bobbin 4-2, there is arranged a coil 7 indicated by a dot line in the figure. The coil 7 is electrically connected to a printed circuit board 13 via coil lead wires 7a.

A core 6 having a square cross-section and a half ring shape is arranged in the hollow portion 4-2a of the bobbin 4-2 and fixed to the case body 1a in such a manner that the core 6 passes through the hollow portion 4-2a of the bobbin 4-2 without touching the wall of the hollow portion 4-2a.

Magnets (permanent magnets) 5A and 5B are arranged to face each other and to face the outer side faces, which are orthogonal to an axis of the shaft 2, of the bobbin 4-2, respectively, with slight gaps between the magnets and the outer side faces, respectively. The magnets 5A and 5B are fixed to a supporting plate 1C and a bottom plate 1d which are formed integrally with the case body 1a, respectively.

A capstan 8 is engaged and fixed to the projecting end portion 2a of the shaft 2.

The shaft 2 of the motor portion of the encoder motor with the above arrangement is rotated in a normal and a reverse directions within the range of a predetermined rotation angle of, for example, about 100° when a normal and a reverse currents are applied to the coil 7.

A code wheel 11 is disposed inside the case 1 and between the supporting plate 1c and the cover 1b. The code wheel 11 is inserted and fixed to the shaft 2. Facing one side of the code wheel 11 and in the vicinity of the peripheral portion (a portion in which slits are formed) thereof, a light source 12 such as an LED is disposed. The light source 12 is mounted on a printed circuit board 13 as an encoder demodulating portion. The printed circuit board 13 is fixed to the case body 1a. Facing the other side of the code wheel 11 and in the vicinity of the peripheral portion thereof, namely facing the light source 12, a phase plate 14 is arranged. Facing the phase plate 14, a photosensor portion (a photodiode matrix) 15 is arranged. The phase plate 14 and the photosensor portion 15 are fixed to the cover 1b of the case 1. The photosensor portion 15 is electrically connected to the printed circuit board 13.

The encoder motor described above has the following drawbacks:

(1) The constitution thereof is complicated. Particularly, the coil 7 is difficult to wind.

(2) Since the code wheel 11 and the coil 7 is connected via the shaft 2, and since the coil 7 and the bobbin 4-2 are fitted, in the form of a cantilever, to the shaft 2, the rigidity of the encoder motor is low, the rotating balance of the movable portion (the rotating portion) is unstable, and the resonant point is low, so that it is difficult to produce the motor.

The present invention will remove the drawbacks of the above-mentioned moving coil type encoder motor.

FIGS. 1(A) and 1(B) are views showing an encoder motor according to an embodiment of the present invention, in which FIG. 1(A) is a front view partly broken, and FIG. 1(B) a cross-sectional view taken along a line $B_1$-$B_2$ shown in FIG. 1(A).

The encoder motor of this embodiment is formed as a swing motor having a rotation angle of about 100°. As shown in FIG. 1, motor case 21 comprises outer wall 21a, a bottom wall 21b, and a cylindrical wall 21c for holding bearings. The motor case 21 is formed continuously in one body and acts also as a magnetic circuit yoke.

A shaft (rotary shaft) 22 has an end portion 22a projecting from one side of the motor case 21 and is supported at the central portion of the motor case 21 through roller bearings 23A and 23B in such a manner that the shaft 22 is rotatable freely in a normal and a reverse directions. The shaft 22 is a hollow shaft with a through hole 22b formed along a center line $\alpha$ of the axis of rotation of the shaft 22. The shaft 22 is provided also with an insertion hole 22c formed radially in the longitudinal middle of the shaft 22. It is possible to omit the through hole 22b for the top of the shaft 22.

The roller bearings 23A and 23B have inner rings formed by the shaft 22 itself and are formed integrally with the shaft 22. The roller bearings 23A and 23B may be referred to as the "shaft bearing" as a whole (FIG. 4(B)). The shaft bearing is provided with a compression spring 23-1 disposed between the bearings 23A and 23B to apply pre-loads in opposite directions along the axis $\alpha$ to the outer rings of the bearings 23A and 23B respectively. Further, the shaft bearing is provided with a sleeve 23-2 for holding the outer rings of the roller bearings 23A and 23B. The sleeve 23-2 has a cylindrical shape and engages with the outer rings of the bearings 23A and 23B to fix them. The compression spring 23-1, the sleeve 23-2 for holding the outer rings, and the shaft bearing are assembled in one body.

Therefore, as shown in FIG. 1(B), by inserting the sleeve 23-2 for holding the outer rings into the bearing holding wall 21c of the motor case 21, and by fixing them together, the shaft 22 and the bearings 23A and 23B are fitted to the motor case 21. In this way, with the provision of the holding wall 21c and the bearings 23A and 23B to be inserted thereto, the fitting accuracy of the bearings can be improved. Namely the rotational accuracy of the shaft 22 can be improved. Although the sleeve 23-2 is not necessarily required, it is preferably disposed.

A capstan 28 is inserted and fixed to the projecting end portion 22a of the shaft 22. A code wheel 31 is arranged concentrically with respect to the shaft 22 and fixed to an inner end face of the capstan 28. A cylindrical bobbin 24 is arranged concentrically with respect to the shaft 22 and fixed to an inner surface of the code wheel 31.

The bobbin 24 has a cylindrical wall 24a and a bottom wall 24b which are integrally formed by, for example, molding. The axis of the cylindrical wall 24a coincides with the axis α of the shaft 22, and an inner surface of the cylindrical wall 24a is slightly spaced apart from an outer surface of the bearing holding wall 21c of the motor case 21. The bottom wall 24b is fixed to the code wheel 31 by adhesives or screws. Moving coils 25A and 25B are disposed on the periphery of the cylindrical wall 24a of the bobbin 24.

Figure 2:
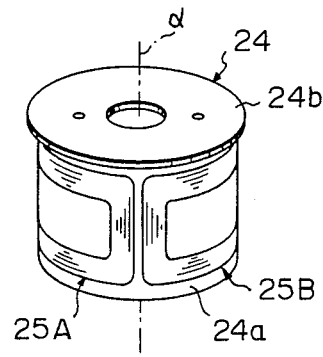
FIG. 2 is a perspective view showing a bobbin of the encoder motor according to the present invention.
Figure 3:
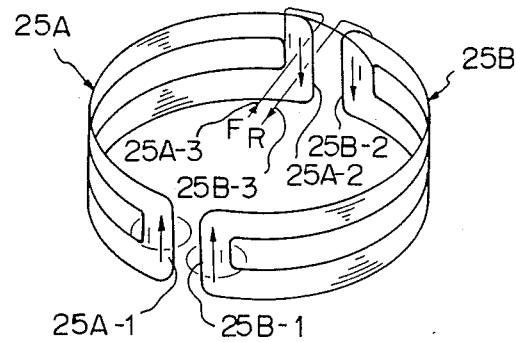
FIG. 3 is a perspective view showing coils of the bobbin shown in FIG. 2.

FIG. 2 is a view showing the bobbin 24 with the coils 25A and 25B disposed thereon, and FIG. 3 is a view showing the coils 25A and 25B. As shown in FIG. 3, each of the coils 25A and 25B is formed by forming a rectangular (square) flat coil of a loop-like shape into a semicylindrical shape. Effective length pairs 25A-1 and 25B-1, and 25A-2 and 25B-2 for generating an effective torque are arranged in parallel with the axis α (FIG. 1), facing each other. As shown in FIG. 2, the coils 25A and 25B are fixed on the periphery of the bobbin 24 (on the cylindrical wall 24a) at opposite positions. The coils 25A and 25B are electrically connected therebetween. It is possible to dispose only one, instead of two, of the coils 25A and 25B.

The bobbin 24 is formed by a material in which the thermal expansion coefficient of the bobbin 24 is substantially equal to that of the code wheel 31, which is made of glass in this embodiment. As a result, distortion due to the thermal expansion of the bobbin 24 and the code wheel 31 can be prevented.

Coil lead wires 25A-3 and 25B-3 of the coils 25A and 25B are pulled out through the insertion hole 22c and the through hole 22b of the shaft 22 as shown in FIG. 1(B).

A pair of magnets (permanent magnets) 26A and 26B are slightly spaced apart in a radial direction from the periphery of the bobbin 24 to face each other in the radial direction. The magnets 26A and 26B are fixed on the inner surface of the outer wall 21A of the motor case 21. One of the magnets 26A and 26B has an N-pole and the other an S-pole.

According to the motor portion with the above-mentioned arrangement, when a normal and a reverse currents are applied to the coils 25A and 25B, the bobbin 24, the code wheel 31, and the shaft 22 are rotated together in a normal and a reverse directions. On the periphery of the capstan 28 and in a radial direction, there is wound, for example, a steel belt (not shown) through which a control operation such as a positioning operation of a driven member is carried out.

In this embodiment, the code wheel 31 is transparent disk made of glass. On the periphery of the code wheel 31, there are provided, by a vapor deposition method, etc., a pattern of slits 31a arranged radially with fixed intervals in a circumferential direction to make a dark and light slit pattern. Facing one side of the code wheel 31 and in the vicinity of the peripheral portion (a portion at which the slits are formed) thereof, a light source 32 such as a light emitting diode (LED) is located. The light source 32 is mounted on the motor case 21. Facing the outer side of the code wheel 31 and in the vicinity of the peripheral portion thereof, namely, facing the light source 32, a phase plate 33 is arranged. Facing the phase plate 33, a photosensor portion (a photodiode matrix) 34 is arranged. The phase plate 33 and the photosensor portion 34 are mounted on a printed circuit board 35 as an encoder demodulating portion. The photosensor portion 34 is electrically connected to the printed circuit board 35, and the printed circuit board 35 is fixed to the motor case 21. The phase plate 33 is provided with a slit pattern (not shown) at a position facing the slit pattern 31a of the code wheel 31.

Preferably, the printed circuit board 35 is provided with an iron core. The printed circuit board having the iron core is made by coating insulating films on both sides of an iron plate and by forming circuit patterns on the films. By virtue of this configuration, the thermal expansion coefficient of the printed circuit board 35 will be substantially equal to that of the yoke (the motor case 21) so that the positional displacement of the phase plate 33 on the printed circuit board 35 can be eliminated to realize a precise control.

A numeral 36 represents a space for mounting the encoder demodulating portion.

The encoder portion of the encoder motor mainly comprises the code wheel 31, the light source 32, the phase plate 33, the photosensor portion 34, and the printed circuit board 35 as the encoder demodulating portion. In the encoder portion, according to the rotation of the code wheel 31, the slit pattern of the code wheel 31 and the phase plate 33 interfere with each other to change the amount of transmitted light from the light source 32. The amount of change in transmitted light is sensed by the photosensor portion 34 which performs a photoelectric conversion on the sensed light. As a result, a two-phase sine wave with a phase difference of 90° (phase difference of ¼ pitch) is demodulated and outputted finally according to the rotation of the code wheel 31. The output signal of two-phase sine wave is fed back to a control portion (not shown) through the coils 25A and 25B, and used, in the case of a magnetic disk drive, for controlling operations such as a positioning control of a magnetic head with respect to a track, and magnetic head control in an access operation.

As described above, according to the present invention, a bobbin (24) provided with coils (25A, 25B) is formed into a cylindrical shape and directly connected with an encoder code wheel (31) to form an integral unit. As a result, the total inertia of the rotary portion of the unit is minimized to realize an improvement in the acceleration, high rigidity (high resonant frequency), and rotating balance thereof. Since a pair of bearings (23A, 23B) for supporting a shaft (rotary shaft) (22) are held by a cylindrical inner surface of a bearing holding wall (21c) formed integrally with a motor case (31), the mechanical accuracy of the bearings can be improved to improve the rotational accuracy of the shaft (22). As a result, a moving coil type encoder motor of compact size having a high efficiency can be realized.

Further, the code wheel is solidly held between a capstan and the bobbin and fixed to the shaft so that the relative positions of a torque generating portion (the bobbin), a torque transmitting portion (the capstan), and a position detecting portion (the code wheel) may come close to each other, thereby improving the rigidity to realize a precise driving control.

In the moving coil type oscillating motor described with reference to FIG. 12, although the lead wires 7a of the coil 7 are disposed with sufficient lengths, the lead wires 7a are directly subjected to repeated stress due to the swing movement of the coil 7 (bobbin 4-2). Accordingly, a problem occurs in that the lead wires 7a are easily subjected to fatigue rupture. For example, the lead wires 7a have no durability against swing motions of 100 million times to 1 billion times, which a magnetic disk unit is required to withstand, and fatigue rupture may occur before that number of swing motions is reached. Further, a space occupied by the lead wires 7a is large so that the size of the motor is cannot be substantially minimized. Since the lead wires 7a affect the rotational operation of the rotary shaft 2, the offset force caused by the lead wire 7a around the rotary shaft 2 is unstable, causing a problem in control operations.

The embodiment shown in FIG. 4 has been invented to eliminate the above problem. This embodiment provides a moving coil type swing motor having a structure for taking out lead wires. According to the embodiment, coil lead wires are not directly subjected to repeated stress, so that the fatigue strength of the lead wires against the repeated stress is remarkably improved to realize a compact encoder motor with an improved controllability.

To remove the above-mentioned problem, according to this embodiment, there is provided a moving coil type swing motor comprising a rotary shaft 22 provided with a hole 22b formed along an axis of rotation a of the rotary shaft 22 and an insertion hole 22c formed in the middle of the hole 22b to communicate with the hole 22b. The motor also comprises coil lead wires 125A-1 and 125B-1 of moving coils 25A and 25B. The coil lead wires 125A-1 and 125B-1 are passed through the insertion hole 22c and the hole 22b, taken out of an end surface 22d of the rotary shaft 22, passed through a terminal fixing plate 126 fixed to the end surface 22d, and fixed to the fixing plate 126. The motor further comprises a ribbon-like intermediate lead wire 127 having elasticity and conductivity wound in a spiral around the periphery corresponding to the radial direction of the terminal fixing plate 126. Inner terminals 127a and 127b of the intermediate lead wires 127 are connected and fixed to the lead wires 125A-1 and 125B-1 respectively, and outer terminals 127c and 127d thereof are fixed to a motor case 121 and are connectable to an external lead wire 130.

The coil lead wires (125A-1, 125B-1) are passed inside the rotary shaft (22), taken out of the end surface (22d), passed through the terminal fixing plate (126) fixed to the end surface (22d), and fixed to the fixing plate (126) so that the coil lead wires (125A-1, 125B-1) may be rotated in oscillation together with the moving coils (25A, 25B) and the rotary shaft (22) to entirely remove the influence of the repeated stress caused by the swing motion. Although the repeated stress due to the swing motion affects the intermediate lead wire (127) wound in a spiral, the repeated stress is dispersed through the lead wire (127) and absorbed within the elastic limit of the lead wire (127). Accordingly, the fatigue strength with respect to the repeated stress of the intermediate lead wire (127) can be remarkably improved so that sufficient durability may be realized against, for example, one billion times of swing motions. Further, by accommodating the coil lead wires (125A-1, 125B-1) in the rotary shaft 22 and by swinging the coil lead wires together with the rotary shaft (22), the size of the motor can be minimized, and the influence of the coil lead wires on the rotating operation of the rotary shaft (22) can be entirely eliminated so that the offset force of the lead wires can be stabilized.

FIGS. 4 to 9 are views for explaining the embodiment according to the present invention.

Figure 4A:
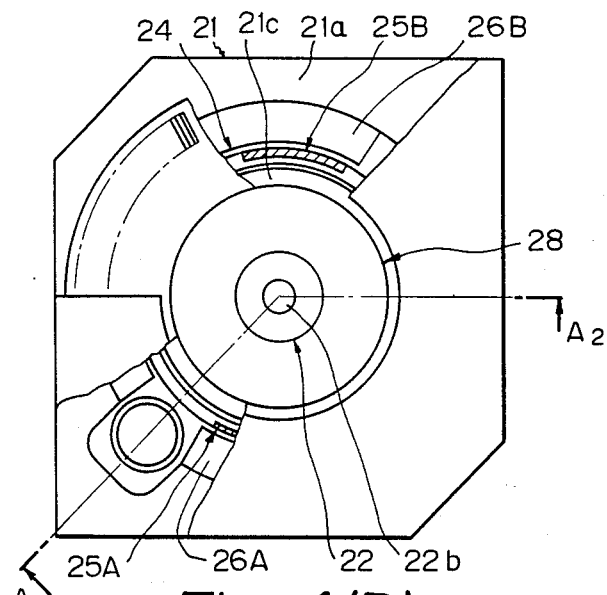
Figure 4B:
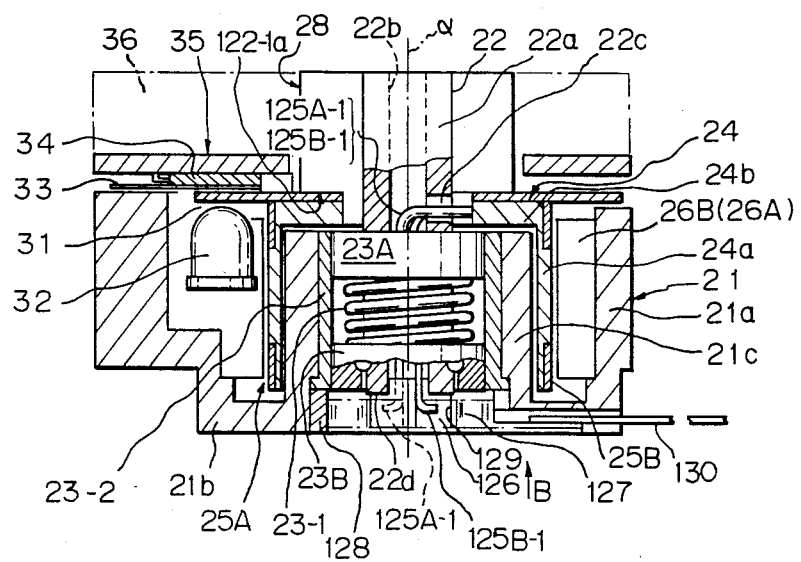
Figure 5:
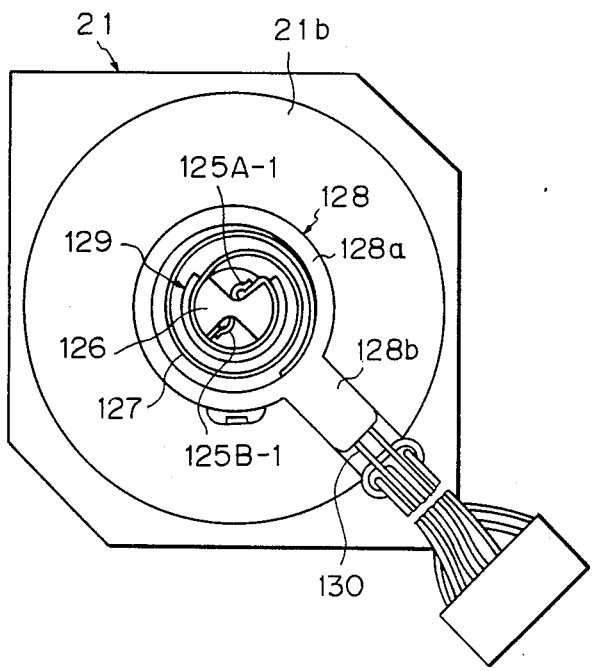
FIG. 5 is a bottom view showing the embodiment shown in FIG. 4; in the direction of an arrow "B" shown in FIG. 4C(B)

FIGS. 4(A), 4(B), and 5 are views showing the embodiment of the moving coil type oscillating motor according to the present invention, in which FIG. 4(A) is a front view, FIG. 4(B) is a cross-sectional view taken along a line $A_1$-$A_2$ shown in FIG. 4(A), and FIG. 5 a bottom view in the direction of an arrow "B" shown in FIG. 4(B). This embodiment is characterized by a structure for taking out coil lead wires, and components other than the taking out structure are the same as those explained with reference to the embodiment shown in FIG. 1. Therefore, these same components are represented by like reference marks, and an explanation thereof will be omitted.

Figure 6A:
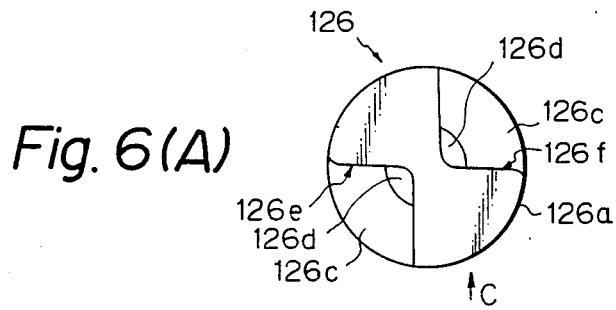
Figure 6B:
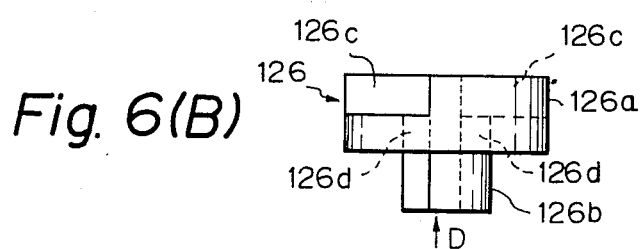
Figure 6C:
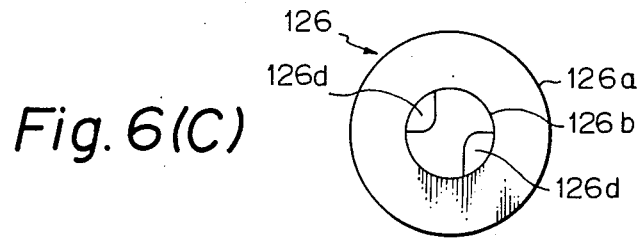

Fixed to the end surface (bottom face) 22d of the rotary shaft 22 is the terminal fixing plate 126. As shown in FIG. 6, the terminal fixing plate 126 is molded from an insulating material such as resin. In FIG. 6, a reference mark 126a represents a body portion, 126b an insertion portion; 126c terminal fixing recesses formed on the body portion 126a; 126d a pair of insertion holes formed by partly cutting the insertion portion 126b to extend in an axial direction through the terminal fixing recesses 126c; and 126e and 126f are side faces of the recesses 126c respectively. The insertion portion 126b of the fixing plate 126 is inserted and fixed to the through hole 22b (FIG. 4(B)) of the rotary shaft 22, and the coil lead wires 125A-1 and 125B-1 are taken out through the insertion holes 126b.

As shown in FIGS. 4(B) and 5, wound in a spiral around the periphery of the terminal fixing plate 126 is the intermediate lead wire 127 which is formed in a ribbon-like (band-like) shape from a elastic conductive material such as beryllium copper. Although the intermediate lead wire 127 shown in FIG. 5 has a small number of windings, for clarity of the drawing, in practice, the number of windings is greater. A lead wire fixing case 128 is arranged to surround the periphery of the intermediate lead wire 127 wound in a spiral. The lead wire fixing case 128 is inserted and fixed to the inner side face of an inner cylindrical wall 21c at a bottom wall 21 of a motor case 21.

Figure 7A:
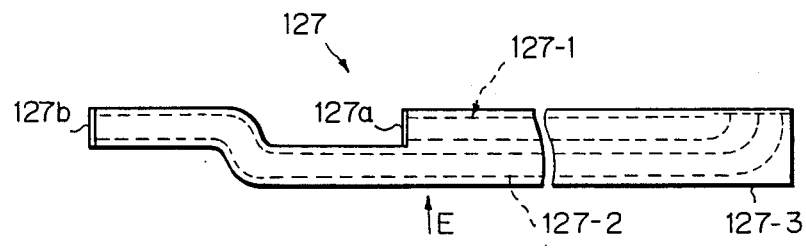
Figure 7B:
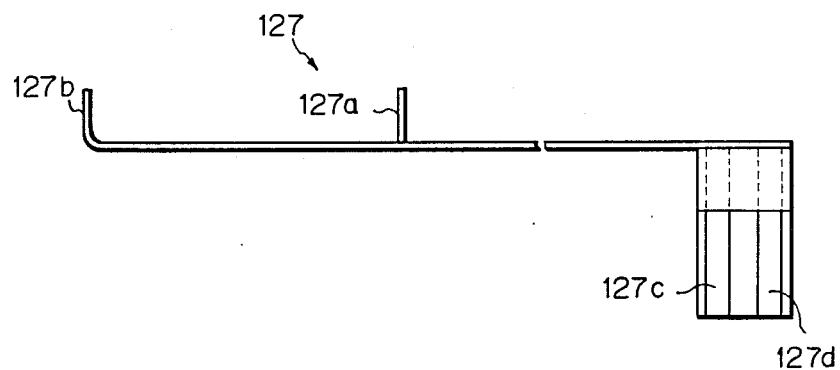
Figure 9A:
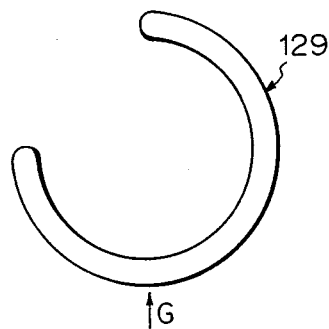
Figure 9B:
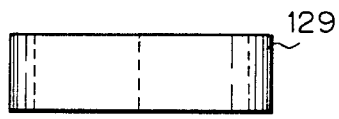

The intermediate lead wire 127 is formed as shown in FIGS. 7(A) and 7(B), in which FIG. 7(A) is a side view and FIG. 7(B) a plan view in the direction of an arrow "E" shown in FIG. 7(A). In FIG. 7, reference marks 127-1 and 127-2 represent ribbon-like conductors made of, for example, beryllium copper. As shown in the figures, the ribbon-like conductors 127-1 and 127-2 are arranged in parallel on an insulating film such as a polyimide film, and fixed integrally therewith. An insulating outer film 127-3 such as a polyimide film is formed thereover to form the ribbon-like intermediate lead wire 127 as a whole. Ends of the ribbon-like conductors 127-1 and 127-2 which will come to an inner side of the spiral, are formed to have different lengths and are bent. The bent portions form connection terminals (inner terminals) 127a and 127b to which the coil lead wires 125A-1 and 125B-1 are connected respectively (FIGS. 4(A) and 5). The connection terminals 127a and 127b are fixed to the side faces 126e and 126f of the respective terminal fixing recesses 126c of the terminal fixing plate 126 shown in FIG. 6. Around the periphery of the terminal fixing plate 126 is fixed a collar 129 (FIG. 5) for securing the fixation of the connection terminals 127a and 127b of the intermediate lead wire 127. The collar 129 is formed into substantially a half-ring shape with a rectangular cross section, as shown in FIGS. 9(A) and 9(B), from an insulating material such as resin.

In FIG. 7, the other ends of the conductors of the intermediate lead wire 127 which come to an outer side of the spiral, are bent in parallel, and the tips of the bent portions are fixed to the fixing case 128 and act as connection terminals (outer terminals) 127c and 127d d to be connected with the external lead wire 130 (FIG. 4).

Figure 8A:
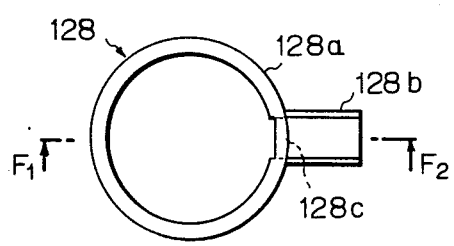
FIGS. 8(A), 8(B), and 8(C) are a plan view, a cross-sectional side view taken along a line $F_1$-$F_2$, and a side view, respectively, showing a lead wire fixing case shown in FIG. 4.
Figure 8C:
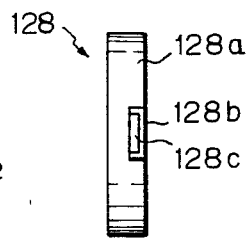
Figure 8B:
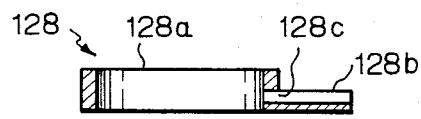

The lead wire fixing case 128 is molded from an insulating material such as resin, as shown in FIG. 8. The case 128 comprises a hollow cylindrical portion 128a and a guide portion 128b. An insertion hole 128c is provided to pass through the cylindrical portion 128a at a portion corresponding to the guide portion 128b. The connection terminals 127c and 127d on the other side of the intermediate lead wire 127 (FIG. 7) are inserted into the insertion hole 128c from an inner side thereof, taken out from the guide portion 128b, and fixed thereto. Further, to the connection terminals 127c and 127d is fixed the external lead wire 130 (FIGS. 4(B) and 5). The inner connection terminals 127a and 127b of the intermediate lead wire 127 (FIG. 7) are fixed to the terminal fixing plate 126 as mentioned in the above, and the outer connection terminals 127c and 127d are fixed to the lead wire fixing case 128. The intermediate portion of the intermediate lead wire 127 is arranged to be able to move freely and to be applied with a proper offset force (restoring force) when necessary.

According to this embodiment, the taking out structure of the coil lead wires 125A-1 and 125B-1 of the moving coils 25A and 25B has an arrangement such as mentioned in the above. When a normal and a reverse currents are applied to the coils 25A and 25B, the bobbin 24, the code wheel 31, the capstan 28, and the rotary shaft 22 are turned all together in a normal and a reverse directions within a predetermined rotation angle. On the periphery of the capstan 28 is wound a steel belt (not shown), and through the steel belt, a controlling operation such as a positioning operation of a driven member (which may be a magnetic head in the case of, for example, a magnetic disk unit) is carried out. At this time, the coil lead wires 125A-1 and 125B-1 move together with the coils 25A and 25B and the rotary shaft 22 so that the coil lead wires are not be affected by the normal and reversal rotation of the rotary shaft 22. Namely, the repeated stress does not affect the coil lead wires. In this embodiment, the repeated stress affects the spiral intermediate lead wire 127. However, the intermediate lead wire 127 has a spring-like characteristic (elasticity) as mentioned above, and the repeated stress acts within the elastic limit of the intermediate lead wire 127. Further, the stress is dispersed through the intermediate lead wire 127 so that the fatigue strength with respect to the repeated stress is remarkably improved, and sufficient durability can be obtained even against, for example, one billion swing motions, thereby remarkably increasing the reliability of the encoder motor. Further, with the structure for taking out the coil lead wires 125A-1 and 125B-1 through the inside of the rotary shaft 22, the coil lead wires 125A-1 and 125B-1 will not affect the rotational operation of the rotary shaft 22 so that the offset force around the rotary shaft 22 can be stabilized, and the size of the motor can be minimized.

As described above, according to the present invention, coil lead wires (125A-1, 125B-1) of moving coils (25A, 25B) are taken out through a rotary shaft (22) of a motor, and fixed to an end face (22d) of the rotary shaft (22) through a terminal fixing plate (126). Around the periphery of the fixing plate (126) is wound a spiral elastic intermediate lead wire (127). With this arrangement, the intermediate lead wire (127) can entirely absorb and remove repeated stress applied to the coil lead wires (125A-1, 125B-1). The intermediate lead wire (127) disperses the absorbs the repeated stress through the lead wire (127) within the elastic limit thereof so that fatigue strength with respect to swing motion can be improved, and sufficient durability against, for example, one billion swing motions, can be realized. Therefore, even if an swinging angle is large, sufficient reliability can be secured. In addition, a space occupied by the coil lead wires (125A-1, 125B-1) can be minimized, and the effect of the coil lead wires (125A-1, 125B-1) with respect to the rotational operation of the rotary shaft (22) can be entirely eliminated. As a result, the size of the motor can be minimized, and offset force around the rotary shaft (22) can be stabilized to improve controllability. Further, by applying an offset force (restoring force) to the intermediate lead wire (127) in advance, and by utilizing the restoring force, it is possible to automatically bring a driven member for controlling the positioning to an original position when a power source of the motor is cut off.

Figure 10A:
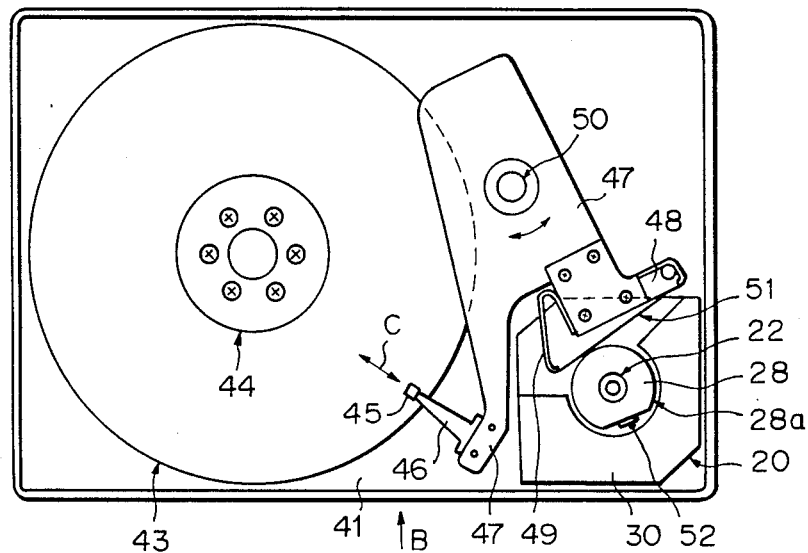
FIGS. 10(A) and 10(B) are a plan view and a cross-sectional side view, respectively, showing a magnetic disk unit to which the present invention is applied.
Figure 10B:
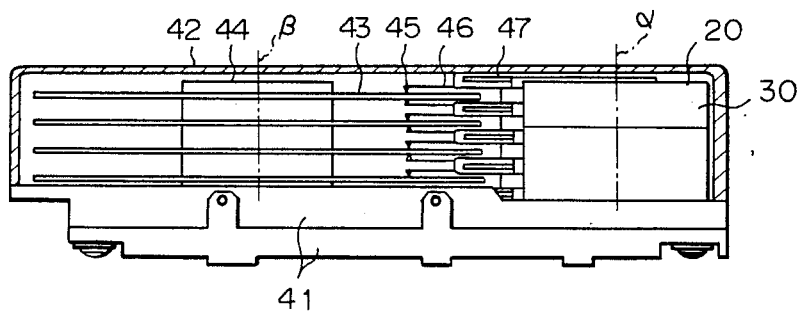

FIGS. 10(A) and 10(B) are views showing a compact magnetic disk drive to which the embodiment shown in FIGS. 1 or 4 is applied, in which FIG. 10(A) is a plan view with a cover removed, and FIG. 10(B) a crosssectional side view with the cover sectioned in the direction of an arrow "B" shown in FIG. 10(A). In the figures, numeral 41 represents a base and 42 a cover, which constitute a casing of the unit. Numeral 43 represents a plurality of magnetic disks each having a diameter of, for example, 3.5 inches. The disks 43 are spaced apart vertically, arranged coaxially in a multistory structure, and fitted to a supporting rotary shaft 44. The disks 43 are rotatable together with the supporting shaft 44 around an axis $\beta$. The supporting shaft 44 is disposed on the base 41. A numeral 45 represents magnetic heads; 46 head arms; 47 a head arm holding member (swing arm); 48 a flex arm fitted to the holding member 47; and 49 a tension spring fitted on the opposite side of the flex arm 48. The holding member (swing arm) 47 is supported rotatably by a supporting shaft 50 disposed on the base 41. Numeral 51 represents steel belt. The steel belt 51 is wound around the periphery 28a of a capstan 28. The steel belt 51 is fixed to the captan 28 by a fitting screw 52 in the middle portion thereof. One end of the steel belt 51 is fitted to the flex arm 48, and the other end thereof is fitted to the tension spring 49. By the resilient force of the arm 48 and the spring 49, the steel belt 51 is applied with predetermined tension. When the capstan 28 is rotated normally and reversely, the holding member 47 is rotated normally and reversely through the steel belt 51 so that the magnetic heads 45 are moved in the directions of the arrow "C" (in radial directions of the disks 43) and positioned to a predetermined location. In this way, the encoder motor (20) according to the present invention is particularly applicable for a compact magnetic disk unit to contribute to minimize the size of the disk unit.

According to this embodiment, the peripheral portion corresponding to the periphery 28a of the capstan 28 and other than the moving area of the swinging portion can be reserved for an encoder disposing space. Within this space, there are mounted encoder constituting elements such as a light source (not shown) facing one side of a code wheel 31, a phase plate (not shown) facing the other side of the code wheel 31, a photosensor portion (a photodiode matrix) (not shown), a printed circuit board as an encoder demodulating portion (not shown), and a demodulating circuit (not shown) to form an encoder portion 30. As a result, the space is effectively used.

Figure 11:
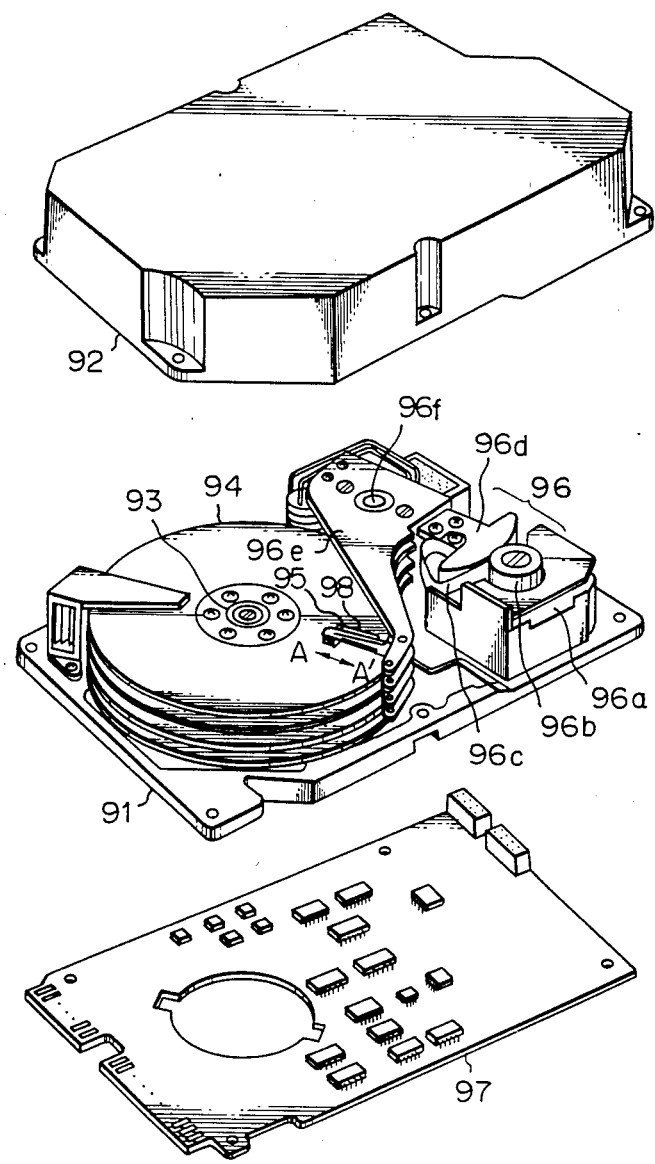
FIG. 11 is a perspective view showing another magnetic disk unit to which the present invention is applied.

FIG. 11 is an exploded perspective view showing another magnetic disk unit to which the encoder motor according to the present invention is applied. As shown in the figure, the disk unit has a case comprising a base 91 and a cover 92. The case accommodates a plurality of magnetic disks 94 fixed to a spindle 93, a plurality of magnetic heads 95 for performing magnetic recording and reading with respect to both sides of respective magnetic disks 94, and a head actuator 96 for oscillating the magnetic heads 95 in the directions of the arrows "A" and "A" on the surfaces of the magnetic disks. The head actuator 96 comprises a driving motor 96a, a capstan 96b, a steel belt 96c, a sector 96d, head arms 96e, a pivot 96f, etc. On the surface of the base 91 are arranged a spindle driving motor, and a main printed circuit board 97 including a printed circuit board (not shown) with a driving circuit for the spindle driving motor and a writing and reading circuit for the magnetic disks.

We claim:

1. An encoder motor having a rotary shaft and comprising:
    an encoder incorporated in said encoder motor, for carrying out position detection and having an encoder code wheel fitted to said motor rotary shaft of said encoder motor;
    a coil formed as a moving coil movable together with said motor rotary shaft;
    a magnet operative with respect to said moving coil; and
    a bobbin in the form of a cylinder on which said moving coil is disposed, said bobbin being arranged concentrically with respect to said motor rotary shaft and fixed to said code wheel of said encoder;
    said motor rotary shaft having a through hole formed along an axis of rotation of said motor rotary shaft and an insertion hole formed at a longitudinal middle position of said motor rotary shaft, said encoder motor further comprising coil lead wires, said coil lead wires extending from said coil and being taken out through said insertion hole and said through hole.

2. An encoder motor as claimed in claim 1, wherein said coil comprises one or two rectangular loop-like flat coils in the form of half-cylinders respectively, effective torque generating portions of said half-cylindrical flat coils being disposed in parallel with said motor rotary shaft at opposite positions on the periphery of a cylindrical wall of said bobbin.

3. An encoder motor as claimed in claim 1, wherein the thermal expansion coefficient of said code wheel is substantially equal to that of said bobbin.

4. An encoder motor having a rotary shaft and comprising:
    an encoder incorporated in said encoder motor, for carrying out positional detection and having an encoder code wheel fitted to said motor rotary shaft of said encoder motor;
    a coil formed as a moving coil movable together with said motor rotary shaft;
    a magnet operative with respect to said moving coil; and
    a bobbin in the form of a cylinder on which said moving coil is disposed, said bobbin being arranged concentrically with respect to said motor rotary shaft and fixed to said code wheel of said encoder;
    said motor rotary shaft having a throughhole formed along an axis of rotation of said motor rotary shaft and an insertion hole formed at a longitudinal middle position of said motor rotary shaft, said encoder motor further comprising coil led wires, said coil led wires extending from said coil and being taken out through said insertion hole and said through hole;
    a swing arm having a limited rotation angle, connected to said motor rotary shaft;
    a terminal fixing plate fixed to an end of said motor rotary shaft; and
    a band-like intermediate lead wire which is tough against fatigue and conductive, and wound in a spiral around the periphery of said terminal fixing plate, said intermediate lead wire having inner terminals connected to said coil lead wires and outer terminals fixed to said motor case to allow said outer terminals to be connected to external lead wires.

5. An encoder motor as claimed in claim 1, further comprising:
    roller bearings for supporting said motor rotary shaft; and
    a cylindrical bearing holding wall formed integrally with a motor case of said encoder motor, outer rings of said roller bearings being held by an inner surface of said cylindrical bearing holding wall.

6. An encoder motor having a rotary shaft and comprising
    an encoder incorporated in said encoder motor, for carrying out positional detection and having an encoder code wheel fitted to said motor rotary shaft of said encoder motor;
    a coil formed as a moved coil movable together with said motor rotary shaft;
    a magnet operative with respect to said moving coil; and
    a bobbin in the form of a cylinder on which said moving coil is disposed, said bobbin being arranged concentrically with respect to said motor rotary shaft and fixed to said code wheel of said encoder;
    roller bearings for said motor rotary shaft;
    a motor case for said encoder motor;
    a cylindrical bearing holding wall formed integrally wtih said motor case of said encoder motor, the outer rings of said roller bearings being held by an inner surface of said cylindrical bearing holding wall;

a swing arm shaft is connected, having a limited rotation angle connected to said motor rotary shaft;

a terminal fixing plate fixed to an end of said motor rotary shaft; and a band-like intermediate lead wire which is tough against fatigue and conductive, and wound in a spiral around the periphery of said terminal fixing plate, said intermediate lead wire having inner terminals connected to said coil lead wires and outer terminals fixed to said motor case to allow said outer terminals to be connected to external lead wires.

7. An encoder motor as claimed in claim 6, further comprising:

a capstan for driving said swing arm, fixed to said motor rotary shaft; and a printed circuit board for controlling said encoder, disposed in the vicinity of the periphery of said capstan outside the moving area of a connecting portion of said capstan and said swing arm.

8. An encoder motor as claimed in claim 7, wherein said printed board is a printed circuit board having an iron core and fixed to a motor yoke.

9. An encoder motor comprising:

a rotary shaft having a rotation angle limited within a predetermined range;

an encoder for carrying out positional detection, having a code wheel fixed to said rotary shaft;

a coil in the form of a moving coil movable together with said rotary shaft;

a magnet operative with respect to said moving coil;

a hole formed on said rotary shaft along an axis of rotation of said rotary shaft, and an insertion hole radially formed in the middle of said rotary shaft to communicate with said hole;

a terminal fixing plate fixed to an end face of said rotary shaft;

coil lead wires extending from said moving coil, said coil lead wires being passed through said insertion hole and said hole, take out of said end face of said rotary shaft, passes through said terminal fixing plate, and fixed to said terminal fixing plate;

a ribbon-like intermediate lead wire which is elastic and conductive and wound in a spiral around the periphery of said terminal fixing plate in a radial direction, said intermediate lead wire having inner terminals connected to said lead wires respectively, and outer terminals fixed to a motor case of said encoder motor to allow said outer terminals to be connected to external lead wires.

10. An encoder motor comprising:

an encoder code wheel;

an encoder integrally formed with said encoder code wheel;

a capstan fitted to an end of an output shaft of said motor, said capstan having a rotation angle limited within a predetermined range to transmit output torque; and encoder means including an encoder demodulating printed circuit board, and a demodulating circuit which are disposed at a peripheral portion of said encoder wheel corresponding to the periphery of said capstan.

11. An encoder motor as claimed in claim 1, further comprising:

a capstan connected to a driven portion of said encoder motor, said capstan and said bobbin being fixed to said motor rotary shaft, said code wheel being solidly connected with said capstan and said bobbin, and fixed to said rotary shaft at a position between said capstan and said bobbin.

12. An encoder motor including:

a rotor;

a stator;

means for generating a rotational force comprising a coil and a magnet disposed on a rotor side and a stator side, respectively;

an encoder code wheel disposed on said rotor side and substantially integral with the rotor; and a capstan for transmitting the rotational force to the outside, the capstan being disposed at an end of the rotor;

said encoder code wheel being disposed between one end of said rotor and said capstan, in direct contact with both said rotor and said capstan, in direct contact with both said rotor and said capstan and secured directly to said rotor.

13. An encoder motor used for head positioning of a magnetic disk drive including:

a rotor;

a stator;

a capstan disposed on one end of said rotor and interconnected with a swing arm which mounts a head for reading information from or writing information on each track of a magnetic tape medium;

means for generating a rotational force comprising a coil and magnet disposed on said rotor and stator, respectively; and an encoder code wheel for head positioning incorporated with the rotation of said capstan, said wheel being disposed coaxially with said rotor in the vicinity of said means for generating the rotational force;

said encoder code wheel being disposed between one end of said rotor and said capstan, in direct contact with both said rotor and said capstan and secured and secured directly to said rotor.

14. An encoder as claimed in claim 13, wherein said capstan is limited to move within a predetermined range of rotational angle and a printed circuit board for controlling said encoder is disposed around said capstan in the portion other than the portion where said swing arm is disposed.

15. An encoder motor as claimed in claim 13, wherein said magnet of said means for generating the rotational force is disposed on the stator side and said coil is disposed on the rotor side, said coil being formed on a bobbin.

16. An encoder motor as claimed in claim 4, further comprising:

a capstan for driving said swing arm, fixed to said motor rotary shaft; and a printed circuit board for controlling said encoder, disposed in the vicinity of the periphery of said capstan outside the moving area of a connecting portion of said capstan and said swing arm.

17. An encoder motor used for head positioning in a magnetic disk drive including:

a rotor;

a stator;

means for generating a rotational force comprising a coil and magnet disposed on said rotor and stator, respectively;

a capstan attached at an end of said rotor and interconnected with a swing arm, which mounts a head for reading information form or writing information on each track of a magnetic disk medium; and an encoder code wheel for generating positioning signals for head positioning incorporated with the rotation of said capstan, said wheel being disposed between said capstan and said means for generating the rotational force and in the vicinity of said means, in direct contact with both said rotor and said capstan and secured directly to said rotor of said rotational force generating means.

18. An encoder motor used for head positioning of a magnetic disk drive including:

a rotor;

a stator;

a capstan disposed on one end of said rotor and interconnected with a swing arm which mounts a head for reading information from or writing information on each track of a magnetic disk medium;

means for generating a rotational force comprising a coil and magnet disposed on said rotor and stator, respectively; and an encoder code wheel for head positioning incorporating with the rotation of said capstan, said wheel being disposed coaxially with said rotor in the vicinity of said means for generating the rotational force, wherein the encoder motor comprising:

an encoder code wheel;

a motor integrally formed with said encoder code wheel; and, a capstan fitted to an end of an output shaft of said mtoor, said capstan having a rotation angle limited within a predetermined range to transmit output torque;

said encoder code wheel having an encoder demodulation printed circuit board, and a demodulation circuit which are disposed in a peripheral portion of said encoder code wheel corresponding to the periphery of said capstan.

19. An encoder motor as claimed in claim 10 or 18, herein the demodulating printed circuit board is provided with an iron core.

20. An encoder motor as claimed in claim 16, wherein said printed board is a printed circuit board having an iron core and fixed to a motor yoke.

* * * * *

UNITED STATES PATENT AND TRADEMARK OFFICE
CERTIFICATE OF CORRECTION

PATENT NO. : 4,795,925

DATED : January 3, 1989

INVENTOR(S) : MIHARA et al

It is certified that error appears in the above-identified patent and that said Letters Patent is hereby corrected as shown below:

Column 14, line 32, "magnetic tape medium" should read --magnetic disk medium--.

Signed and Sealed this

Twenty-second Day of May, 1990

Attest:

HARRY F. MANBECK, JR.

Attesting Officer

Commissioner of Patents and Trademarks